Sept. 20, 1971  T. A. ST. CLAIR  3,605,480
GAS METER PROVING OR CALIBRATING MEANS
Filed Feb. 4, 1970  2 Sheets-Sheet 1
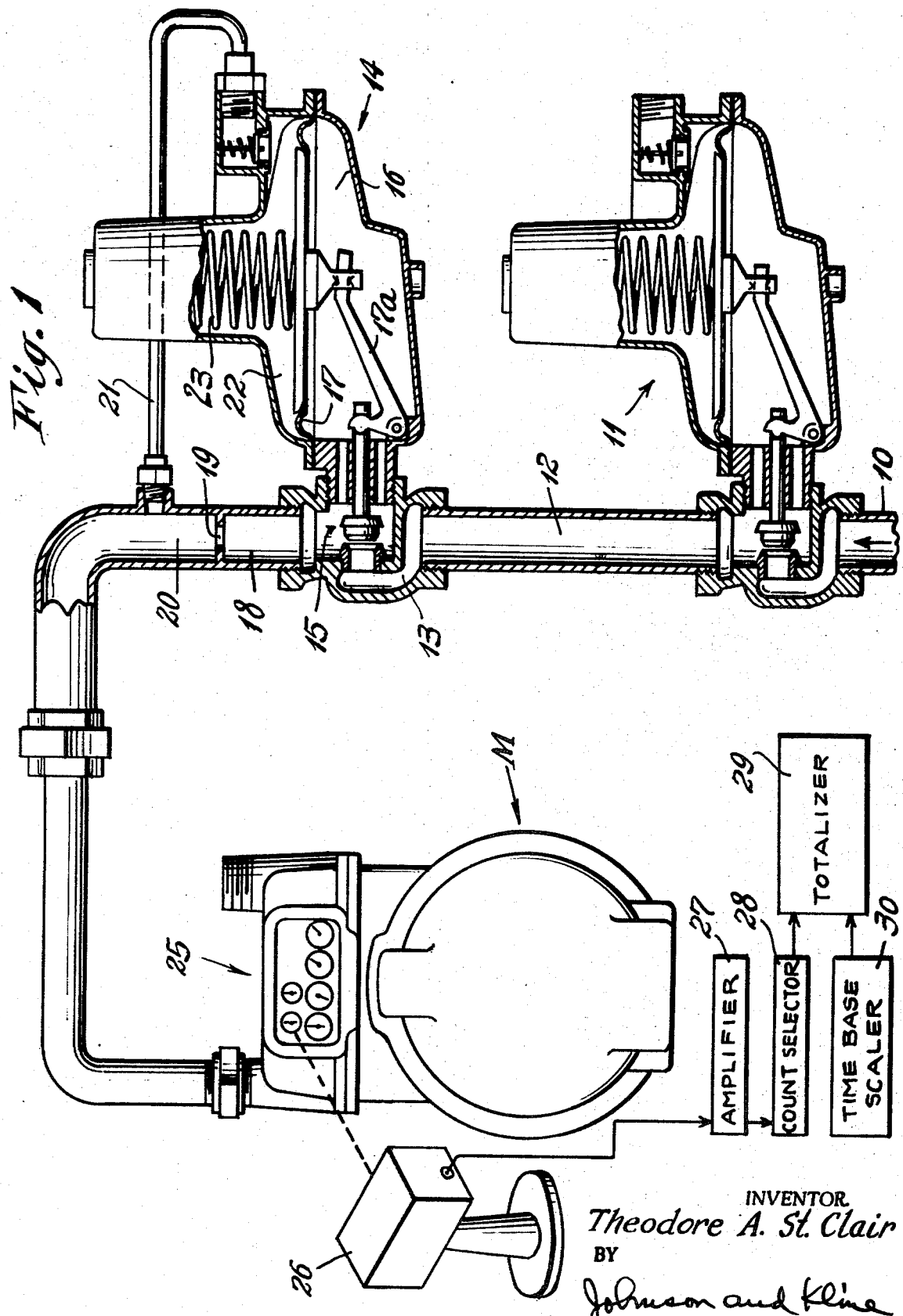
INVENTOR.
Theodore A. St. Clair
BY
Johnson and Kline
ATTORNEYS

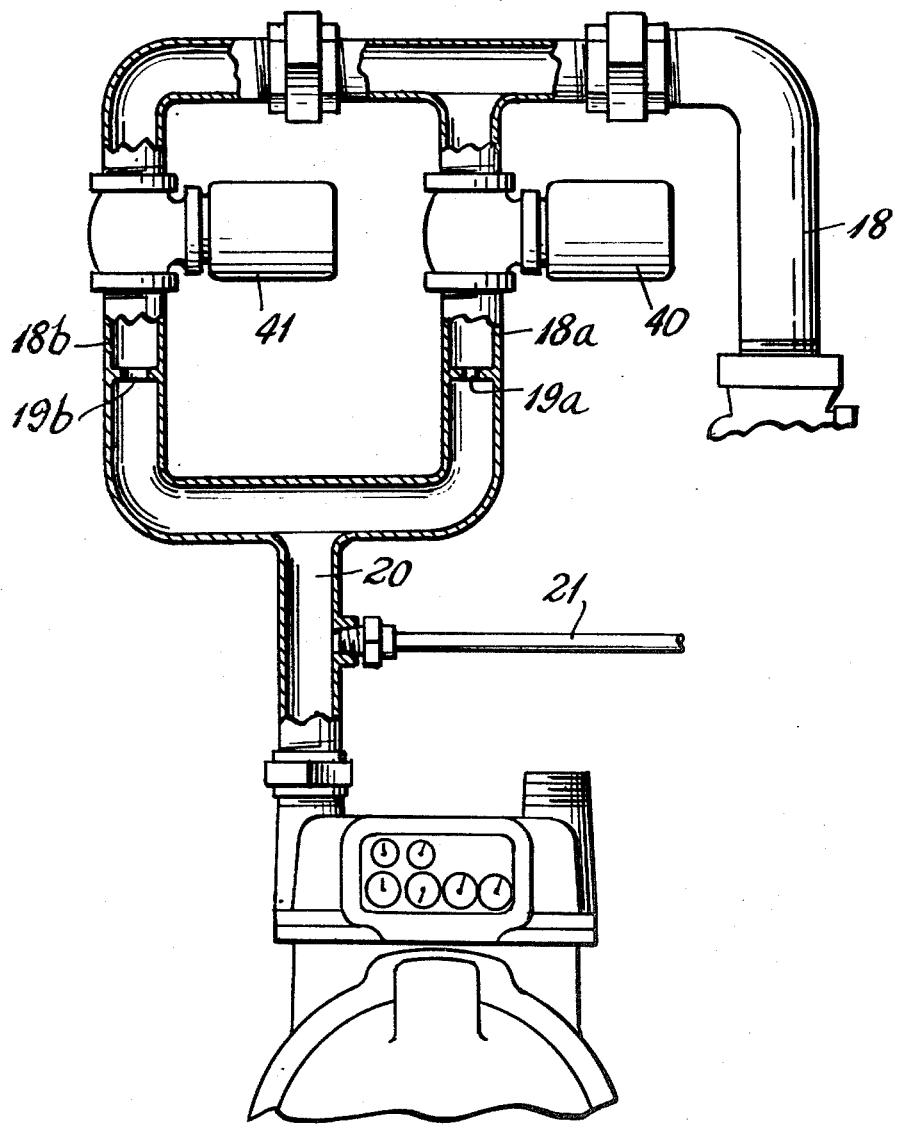

3,605,480
Patented Sept. 20, 1971

3,605,480
GAS METER PROVING OR CALIBRATING MEANS
Theodore A. St. Clair, Fairfield, Conn., assignor to
Textron, Inc., Providence, R.I.
Filed Feb. 4, 1970, Ser. No. 8,469
Int. Cl. G01f 25/00
U.S. Cl. 73—3                                     2 Claims

ABSTRACT OF THE DISCLOSURE

A device for improving the acuracy of the testing and calibrating of gas meters by means of the flow rate, rather than a static measurement, to reduce errors due to temperature variations in the gas. This is accomplished by connecting the meter to a pressure regulator through an orifice and connecting the upper chamber of the regulator to a point between the orifice and meter to control the regulator by sensing the pressure between the orifice and meter.

---

Heretofore in testing or adjusting a gas meter, the meter volumetric displacement has been compared to a known volume of a cylinder closed at its upper end which descends over a liquid to displace a measured amount of trapped air. This apparatus is known as a "bell prover." A serious problem is encountered with the use of these "bell provers" since it is necessary to know the specific volume of gas being transferred and this is directly related to the absolute temperature of the gas being measured.

It is an object of the present invention to improve and increase the accuracy of the tests of the meter by utilizing a measurement of the "flow rate" instead of a static measurement inasmuch as the effect of the temperature on the flow rate is the square root of the temperature difference rather than the direct temperature difference. Thus, errors in temperature variations are halved over the conventional methods of proving.

Another object of the invention is to provide a relatively smaller apparatus which is less subject to environmental temperature change.

This is accomplished according to the present invention by providing a system including a pressure reducing regulator, a constant flow rate controller and a means for reading the index of the meter being tested. If desired, the device can be utilized to selectively test two flow rates, namely, capacity rate and a check rate to further increase the accuracy of the proof of the meter.

Other features and advantages of the invention will be apparent from the specification and claims when considered in connection with the accompanying drawings in which:

FIG. 1 shows a view partly in section of a flow rate testing unit.

FIG. 2 is a view of the testing unit for testing different rates.

As shown in FIG. 1, the test gas, usually air, enters pipe 10 from a source (not shown) and a usual low pressure regulator 11 controls the pressure to a constant pressure in pipe 12. The gas from pipe 12 enters an inlet 13 of a constant flow rate controller 14. This flow rate controller is a normal pressure regulator which is connected into the system differently to establish a constant rate of flow through the meter M being tested.

As shown in FIG. 1, the gas from pipe 12 passes through the valve 15 of the flow rate controller to the chamber 16 below diaphragm 17. Gas passing through valve 15 as controlled by diaphragm 17 and link 17a passes into the pipe 18 through an orifice 19 therein to a pipe 20. A controller pipe 21 taps into pipe 20 and connects to the chamber 22 above the diaphragm 17 and thus establishes a constant differential pressure across the orifice 19. For example, the differential pressure between the volume of gas in chamber 16 and chamber 22 is established by the effective area of the diaphragm 17 and spring 23. Gas from pipe 12 is throttled by valve 15 and enters pipe 18 and passes through orifice 19 to pipe 20. The pressure in pipe 20 is referenced to the chamber 22 by pipe 21. The pressure under the diaphragm in chamber 16 remains substantially the pressure in pipe 12. This establishes a constant flow rate through the orifice 19. If the flow rate through the orifice 19 increases, the differential pressure across it will increase and the pressure in pipe 20 decreases. Through pipe 21 this will cause a decrease in the pressure in chamber 22 causing the diaphragm to rise and close the valve 15 to reduce the flow rate to return it to its constant value. If the flow rate through the orifice 19 is decreased, the reverse operation of the controller takes place and restores the constant flow rate.

Gas at a constant flow rate flows through pipe 20 to the meter M connected thereto to operate the meter index 25. Associated with the meter is a timing apparatus which consists of a usual photoelectric pickup 26 which is focused so that it senses one or more rotations of the meter index 25. This pickup is connected through an amplifier 27 to a usual electronic counter 28 and totalizer 29 having a conventional built-in apparatus 30, such as the Anadex Preset Scaler Timer manufactured and sold by the Anadex Instruments, Inc. of Van Nuys, Calif., for a proper scaling connected thereto. The volume of the gas passed through the meter is then the rate of gas flow multiplied by the time required to pass the selected number of revolutions of the meter index device.

If it is desired to calibrate the meter for two test rates of flow, such as a "capacity rate" and a "check rate," this can readily be accomplished. The system is the same as shown in FIG. 1 with the exception that pipe 18 is provided with two branches 18a, 18b, as shown in FIG. 2, which merge into pipe 20. The branch 18a has a solenoid shut-off valve 40 and an orifice 19a. The branch 18b has a solenoid shut-off valve 41 and an orifice 19b. The orifices 19a and 19b determine the "capacity rate" or the check rate" and by controlling the valves 40, 41 either branch can be connected to the meter and the meter can be readily tested for each as explained above.

From the foregoing it will be seen that the present invention embodies a small, simple device which is less subject to environmental temperature changes.

Variations and modifications may be made within the scope of the claims and portions of the improvements may be used without others.

I claim:
1. A meter prover comprising a source of test gas, a conduit for feeding said gas to a meter, said conduit having an orifice, means connected to said conduit to maintain a constant differential pressure across said orifice whereby a constant flow rate of gas is fed to said meter, and means, including a time base device, for reading an index on said meter to determine the rate of flow of gas through the meter in a predetermined time to establish the volume, said means for maintaining a constant differential pressure across said orifice comprising a pressure regulator having a diaphragm forming a pair of chambers therein, one of said chambers being connected to said conduit through a valve means at a location prior to said orifice, said valve being controlled by said diaphragm, and the other chamber being connected to said conduit after said orifice whereby the pressure in said other chamber is related to the pressure in the conduit after the orifice.

2. A meter prover comprising a source of test gas, conduit means for feeding said gas to a meter, said conduit means having a plurality of branches in parallel each having an orifice to produce a predetermined different rate of gas flow and a control valve, said valves being operable to selectively control the flow of gas through said branches to said meter, means connected to said conduit means to maintain a constant differential pressure across said orifice whereby a constant flow rate of gas is fed to said meter, and means, including a time base device, for reading an index on said meter to determine the rate of flow of gas through the meter in a predetermined time to establish the volume, said means for maintaining a constant differential pressure across the selected orifice comprising a pressure regulator having a diaphragm forming a pair of chambers therein, one of said chambers being connected to said conduit through a valve means at a location prior to said orifice, said valve being controlled by said diaphragm, and the other chamber being connected to said conduit after said orifice whereby the pressure in said other chamber is related to the pressure in the conduit after the orifice.

References Cited
UNITED STATES PATENTS

| | | | |
|---|---|---|---|
| 1,893,200 | 1/1933 | Dolybey et al. | 73—3X |
| 2,710,537 | 6/1955 | Schuler et al. | 73—3 |
| 3,344,667 | 10/1967 | Maltby | 73—3UX |
| 3,469,442 | 9/1969 | Brueckner | 73—3X |

LOUIS R. PRINCE, Primary Examiner

W. A. HENRY II, Assistant Examiner